United States Patent
Skinner et al.

(10) Patent No.: US 6,865,022 B2
(45) Date of Patent: Mar. 8, 2005

(54) RETICLE FOR CORRECTING PARALLAX SHIFT IN AIMING TELESCOPES

(76) Inventors: Stanley J. Skinner, 2812 W. Wagon Wheel Dr., Tucson, AZ (US) 85745; Sidney D. Moore, 2173 N. Wilkes Ct., Claremont, CA (US) 91711

( * ) Notice: Subject to any disclaimer, the term of this patent is extended or adjusted under 35 U.S.C. 154(b) by 24 days.

(21) Appl. No.: 10/407,541

(22) Filed: Apr. 5, 2003

(65) Prior Publication Data

US 2004/0201886 A1 Oct. 14, 2004

(51) Int. Cl.[7] .............................. G02B 23/00; F41G 1/38
(52) U.S. Cl. ........................ 359/428; 359/399; 359/429; 42/130; 42/144
(58) Field of Search ................................ 359/399–429; 42/122–144

(56) References Cited

U.S. PATENT DOCUMENTS

| | | | |
|---|---|---|---|
| 912,050 A | * 2/1909 | Wanee | 42/144 |
| 2,420,273 A | * 5/1947 | West | 359/498 |
| 2,498,706 A | * 2/1950 | Pease et al. | 42/111 |
| 3,313,026 A | * 4/1967 | Akin, Jr. | 42/122 |
| 3,336,831 A | 8/1967 | Unertl, Jr. | |
| 3,516,736 A | 6/1970 | Weaver | |
| 3,777,404 A | * 12/1973 | Oreck | 42/120 |
| 3,782,822 A | * 1/1974 | Spence | 356/21 |
| 4,053,765 A | 10/1977 | Kuffer | |
| 4,072,396 A | 2/1978 | Ross | |
| 4,537,732 A | * 8/1985 | Ueda et al. | 264/1.1 |
| 4,616,421 A | * 10/1986 | Forsen | 42/130 |
| 5,208,989 A | 5/1993 | Sanders | |
| 5,867,915 A | * 2/1999 | McMillan | 42/123 |
| 6,453,595 B1 | 9/2002 | Sammut | |

* cited by examiner

*Primary Examiner*—Thong Q Nguyen (57) ABSTRACT

An improved reticle for optical instruments such as telescopic sights, riflescopes and surveying telescopes, provides a primary indicator at the focal plane of the instrument and a secondary indicator spaced, axially, apart from, and viewable with, the primary indicator. When an operator's eye is properly centered on the optical axis of the instrument, the indicators provide visual feedback to the operator of such proper alignment. When an operator's eye is laterally displaced from the optical axis, the indicators provide visual feedback indicative of improper positioning of the eye. Thus, an operator may readily, and intuitively, make the necessary adjustments to the relationship of the eye to the optical axis to correct for misalignment without the need for cumbersome mechanical adjustments and special mechanisms.

29 Claims, 8 Drawing Sheets

RETICLE FOR CORRECTING PARALLAX SHIFT IN AIMING TELESCOPES

DEFINITIONS

The plane of focus within an optical instrument has a range within which an image may be focused for viewing by an operator. In the following specification and claims it is to be understood that the term 'focal plane' is to be construed as meaning any point within that range. The term 'crosshairs' as used herein is to be construed to mean a single horizontal indicator and a single vertical indicator crossing at their respective centers. A 'set' of crosshairs means one vertical crosshair combined with one horizontal crosshair. And, objective and occular lenses may both comprise one or more individual lens elements.

BACKGROUND OF THE INVENTION

The present invention relates to optical instruments such as telescopic sights, riflescopes, surveying telescopes, and the like, for the accurate alignment thereof with objects of interest. More particularly, the present invention relates to the reticles employed by these classes of instruments.

It is well-known in the art of telescopic sights, such as riflescopes and surveying telescopes, which comprise an objective lens, or lenses, and an ocular lens, or lenses, and image-erecting optics, that images of objects at different distances from an operator, being viewed by means of the optical instrument, focus at different points along the internal optical axis of the instrument. For instance, the image of a near object being viewed by an operator through the optics of such an instrument is focused at a point somewhat more rearward (closer to the ocular end) on the optical axis than is the image of a more distant object which will focus farther away from the ocular end of the optical instrument. When the optical instrument is equipped with a fixed alignment reticle, as in the case of a riflescope, this shift in focus introduces parallax error between the image of the object and that of the reticle. This means that the axially-fixed alignment reticle will not be on the same plane as the image of the object formed by the objective lens system. In this case, if the operator's eye is not perfectly aligned with the optical axis of the instrument, the images of the object and the reticle will not coincide. The result is misalignment of the object image with the image of the reticle which degrades the accuracy of optical instruments that are required to provide precise alignment of the object image with that of the reticle image.

In riflescopes, parallax error is generated by the instrument being focused at a distance different from that of the target being viewed thereby in combination with the lateral displacement of the operator's eye from the optical axis. The importance of centering the eye on the optical axis of the riflescope is extremely important and is easily demonstrated. Typically, riflescopes have an eye relief of three inches to allow adequate space between the rear of the scope and the shooter's eye so that, when the rifle is discharged, the apparatus does not travel far enough back under recoil to strike the shooter's face. Considering a reasonably close target distance of one hundred yards, a one-degree deviation of the shooter's eye off-axis (a mere 0.087" [2.2 mm] to one side) will result in a parallax error at the target of sixty-three inches. In other words, the aim is off by a distance of over five feet even though the shooter may have, otherwise, perfectly aligned the image of the crosshairs with the image of the target. Targets at greater distances will generate increasingly greater parallax error. Thus, in the example given, if the distance is increased to 200 yards, the error would double to over ten feet.

Thus, when these two negative factors, parallax and displacement of the operator's eye from the optical axis, are combined, as they often are, the resulting error can be overwhelmingly great. The prior art has failed to provide visual feedback to the operator of the presence of these deleterious conditions. Until the present invention, there has been absolutely no way for the operator of instruments of these classes to be alerted to these negative conditions. The present invention remedies these defects of the prior art by providing visual indicators that serve to neutralize these negative factors that work against the accuracy of these instruments.

Because of the potentially significant shift in the point of focus of images of objects of interest due to variations in the distance from the operator of objects of interest, some means must be provided to compensate for the discrepancies of axial alignment to eliminate the deleterious effects of parallax error which render optical alignment inaccurate for purposes where precise alignment is critical, such as the aiming of handheld hunting rifles, tactical weapons, and surveying telescopes.

The prior art, such as U.S. Pat. No. 4,072,396, issued Feb. 7, 1978, to Cecil Jack Ross, has addressed this problem by providing mechanical means for the adjustment of the position of the objective lens system along the optical axis so as to move the image formed thereby to coincide with that of the alignment reticle. A severe limitation of the Ross device is that it requires coordination of the operator's hand (to turn the objective lens barrel) and eye (to observe the 'approximate' range-focus setting). Another major limitation of this device is it requires the user to estimate the distance to the target.

A similar approach is taught by U.S. Pat. No. 3,516,736, issued Jun. 23, 1970, to William R. Weaver. The Weaver structure teaches a focusing objective for telescope sights for firearms employing a slidable lens cell and a threaded drive collar for urging the lens cell in one direction in opposition to a biasing means urging the lens cell in the opposite direction for the purpose of focusing a target image on the same plane occupied by a reticle within the telescopic sight.

Another example of the prior art that seeks to overcome the problem of parallax in the alignment of optical images is taught by U.S. Pat. No. 3,336,831, issued Aug. 22, 1967, to J. Unertl, Jr. As with Ross and Weaver, Unertl utilizes a moving objective lens assembly. But, in the case of Unertl, the objective lens components are moved by a cam and pin arrangement which, according to the patent, provides greater control of the movement of the objective components. But, as in the structures of Ross and Weaver, Unertl's device requires the coordination of hand, to perform a physical act (adjustment of the objective lens barrel) and eye of the operator (to observe the 'approximate' range-focus setting). And, as with Ross, a limitation of the Unertl device is it depends upon the user to provide an accurate estimate of target distance.

Another, and severe, drawback to the devices of the prior art such as those taught by Ross, Weaver and Unertl is that the excessive time required to estimate the target's distance and manually set the range focus before acquiring a sight picture of the target can easily mean that the target of interest may move out of sight or become aware of the user's presence due to the additional time and movements required by the act of range focusing.

Perhaps the greatest drawback to the prior art as exemplified by the above references is their potential for leakage at the interface between the adjustable objective lens and the housing of the instrument. Even the smallest amount of moisture is disastrous to optical telescopes because, once inside, it vaporizes, fogging the inside lens surfaces, totally obscuring visibility through the instrument. For this reason, modern manufacturing practice in these classes of products include a final step of vacuum purging to remove all ambient air, replacing it with pure nitrogen gas which is totally inert, and, then, hermetically sealing the instrument. Such sealing is difficult to maintain in devices that utilize range-focusing objectives.

A different approach to the aiming of a firearm is taught in U.S. Pat. No. 5,208,989, issued May 11, 1993, to Ronald J. Sanders. The Sanders device is directed to the aiming of a slug barrel shotgun which is a short range firearm requiring no compensation for parallax due to long range firing requirements of hunting and tactical rifled firearms and surveying instruments as contemplated by the present invention. Sanders teaches a sighting device with two plano-plano reticles, each bearing an illuminated aiming reference. There is no magnification in the optics of the Sanders device which is intended for use with firearms of the pistol class and non-firearms that require extended eye relief mounting. The Sanders structures are more akin to 'notch and bead' aiming arrangements than to optical instruments such as riflescopes. Thus, in applications addressed by Sanders, there is no parallax problem as in riflescopes of the magnified variety as addressed by the teachings of the present invention.

U.S. Pat. No. 6,453,595, issued Sep. 24, 2002, to Dennis J. Sammut, which is a continuation-in-part of application Ser. No. 09/129,729, filed on Aug. 5, 1998, now U.S. Pat. No. 6,032,374, which is a continuation-in-part of application Ser. No. 08/986,458, filed on Dec. 8, 1997, now U.S. Pat. No. 5,920,995, discloses a reticle for riflescopes having a single so-called "ghost ring" axially centered and encircling a variety of aiming indicia, including crosshairs. The purpose of the "ghost ring" is to aid in the centering of the user's eye on the optical axis. However, how this single "ghost ring" aides the user is not entirely clear. At column 12, lines 51–53, it is stated that "By insuring that the ghost ring 41 is centered within the field of view of the scope, the reticle will likewise be centered." However, because the overall field of view through a scope is not readily discernible by an operator it is a very unreliable reference with which to judge centering of the "ghost ring". The reason for this is the fact that riflescopes are, as previously mentioned, designed to provide approximately three inches of eye relief (the distance from the end of the scope to the user's eye) to prevent injury from kick-back when the firearm is discharged. This distance presents the user with a sight picture that is slightly less than the overall field of view of the scope. Thus, the only thing visible to the user, other than the sight picture, is the outer ring of the ocular housing which, at three inches, appears extremely blurry and indistinct.

BRIEF SUMMARY OF THE INVENTION

By extreme contrast, the present invention eliminates all the limitations of the prior art and permits instantaneous and intuitive, parallax-free, target acquisition with no adjustments whatsoever, no matter how varied is the distance of the target from the user. In addition, the present invention accomplishes these improvements simply and inexpensively with an easily implemented change in the configuration of the reticle utilizing fabrication means that are old and proven by years of use in the art. Furthermore, implementation of the present invention results in absolutely no increase in the cost of production for manufacturers of optical instruments. In addition, the present invention does not compromise the integrity of the hermetic sealing of the instrument.

The present invention achieves these new and unexpected results in an optical instrument of the type having a housing, an objective lens mounted in the housing at one end thereof, an occular lens mounted in the housing at the opposite end, the two lenses defining an optical axis through the housing, and image-erecting optics mounted within the housing on the optical axis. A novel reticle having spaced apart primary and secondary indicators is mounted on a focal plane of the occular lens for viewing by an operator or user along with an image of an object of interest for aiming the optical instrument at the object. When the eye of the operator or user is shifted off-axis with regard to the optical axis of the instrument, parallax error is introduced, adversely affecting the accuracy of the aim of the instrument. The Novel primary and secondary indicators provide visual indicators of this parallax error and allow the operator or user to intuitively and instantaneously align the images of the primary and secondary indicators to perfect parallax-free aiming of the instrument at the object of interest.

Thus, it is an object of the present invention to provide, in optical instruments such as riflescopes and surveying telescopes, and without cumbersome range-focusing mechanisms, intuitive and instantaneous axial alignment of images formed thereby to eliminate parallax error.

It is another object of the present invention to eliminate the need for manual focusing of the objective lenses of optical instruments, such as riflescopes and surveying telescopes, to eliminate parallax error when aiming the instruments at objects of interest at different distances from the operator.

Another advantage of the present invention is the cancellation of the deleterious effects of parallax error in the accurate aiming of optical instruments of the classes addressed by the present invention.

It is yet another advantage of the present invention to provide intuitive means by which an operator may align his/her eye precisely upon the optical axis of optical instruments of these classes.

Another advantage of the present invention is the elimination of the need for an operator to make any adjustments, such as for turning rings for focusing to eliminate parallax error in the aiming of optical instruments such as riflescopes.

Another advantage of the present invention is the elimination of the need for an operator to estimate the distance to a target of interest in order to provide accurate aim of devices of the present invention at targets of interest at various ranges.

An additional advantage of the present invention is the elimination of the need for a movable objective lens assembly in order to provide accurate aim of instruments of the classes of art addressed by the present invention.

Another advantage of the present invention is the elimination of the additional time required for estimation of distance to a target of interest and the subsequent manual focusing of the objective lens to compensate for range variations.

Yet another advantage of the present invention is the elimination of moving components that provide the potential for undesirable leakage between the housing and the movable components.

DETAILED DESCRIPTION OF THE INVENTION

For purposes of clarity and general simplicity, the present invention shall be described with regard to its embodiment as a riflescope for attachment to a firearm for the accurate aiming thereof at targets of interest to the operator, or, shooter. This is no way is to be construed as restrictive, or otherwise limiting, of the present invention's range of application in other arts, such as the art of surveying telescopes and other optical alignment instruments.

Figure 1:
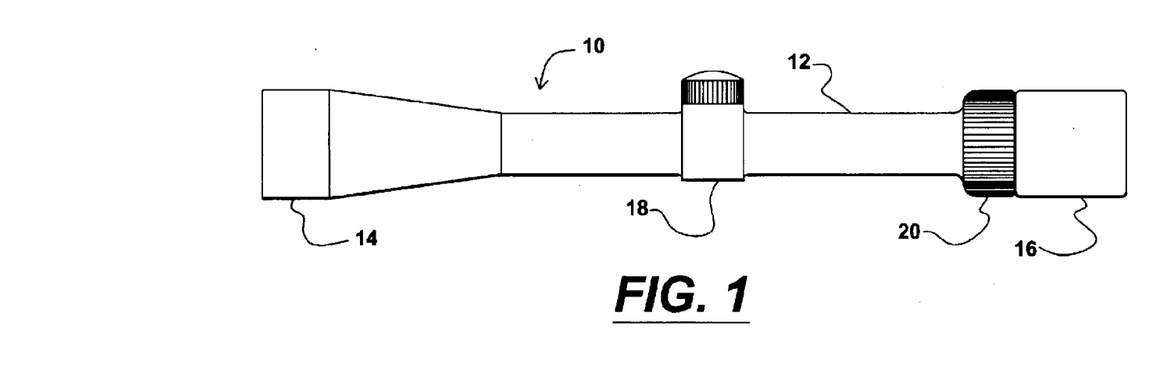
FIG. 1 is a side view of an embodiment of the invention as a riflescope.

An embodiment of the present invention in the form of a riflescope is shown in FIG. 1. Among numerous other components, riflescope 10 comprises a housing 12 with objective barrel 14 disposed at one end thereof and ocular barrel 16 disposed at the opposite end. Also shown are windage and elevation adjustment saddle 18 and power change ring 20. Adjustment saddle 18 and power change ring 20 are shown only for the purpose of clarity since these components are common in modem, variable power, riflescopes, but, do not bear a direct relationship with the scope of the present invention. Contained within housing 12 are numerous optical components that are best described and understood with regard to FIG. 2.

Figure 2:
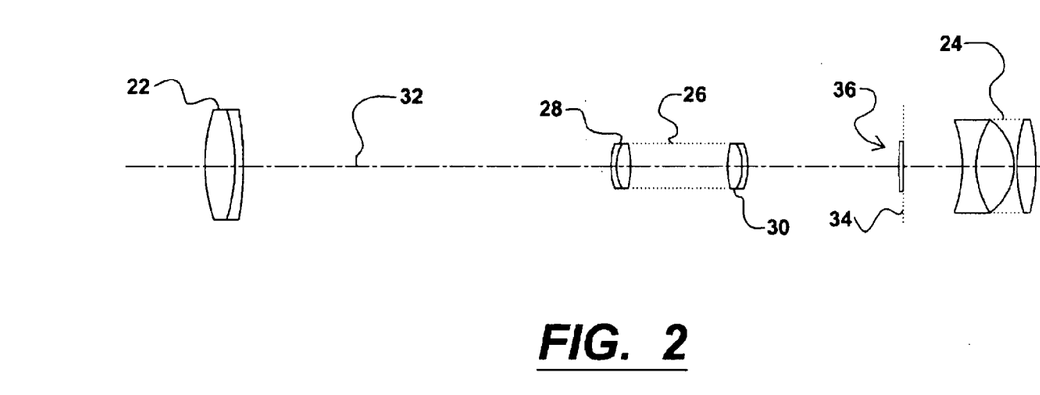
FIG. 2 is a diagram of the optical components of the riflescope shown in FIG. 1.

With reference to FIG. 2, objective lens 22 is carried within objective barrel 14 (FIG. 1) and ocular lens 24 is carried within ocular barrel 16 (FIG. 1). Objective lens 22 is the primary target image-forming optical element and ocular lens 24 is provided for forming a magnified image of the target and aiming reticle 36 for viewing by an operator looking into ocular lens 24.

Because a lens such as objective lens 22 forms an inverted image, optical instruments of require additional optical elements intermediate of the objective and ocular lenses for the purpose of erecting the image for life-like viewing by the operator when observing the image through the ocular lens. Serving this function is erector optics tube 26 which comprises erecting lenses 28 and 30. Together with objective lens 22, erecting lenses 28 and 30 form a final, erect, image on image plane 32. Ocular lens 24 is provided with means by which it can be focused upon image plane 32 so as to provide a sharp image of the target or other object of interest and reticle 36 for viewing by an operator. Objective lens 22, erecting lenses 28 and 32, and ocular lens 24 and reticle 36, all share a common central optical axis 32.

Fixedly mounted in housing 12 (FIG. 1), is reticle 36. The elements of reticle 36 are better described and understood with reference to FIGS. 3 and 4.

Figure 3:
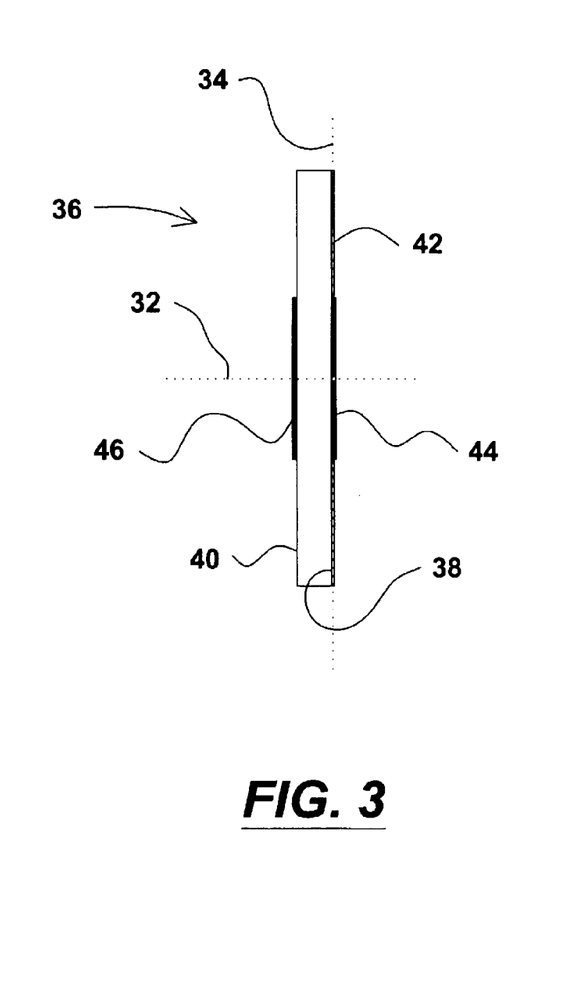
FIG. 3 is an enlarged diagrammatic side view of the reticle depicted in FIG. 2.

With reference to FIG. 3, reticle 35 is shown in a diagrammatic view from the side. Reticle 36 comprises opposing planar faces 38 and 40. Reticle 36 may be fabricated from optically flat glass, or the like. In a prototype of the present invention, a glass reticle has a thickness of 0.100". The significance of the thickness of the reticle will become clear as the description of the present invention proceeds.

Also shown in FIG. 3 are the relationships of target image focal plane 34, crosshairs 42, primary indicator 44, and secondary indicator 46.

Figure 4:
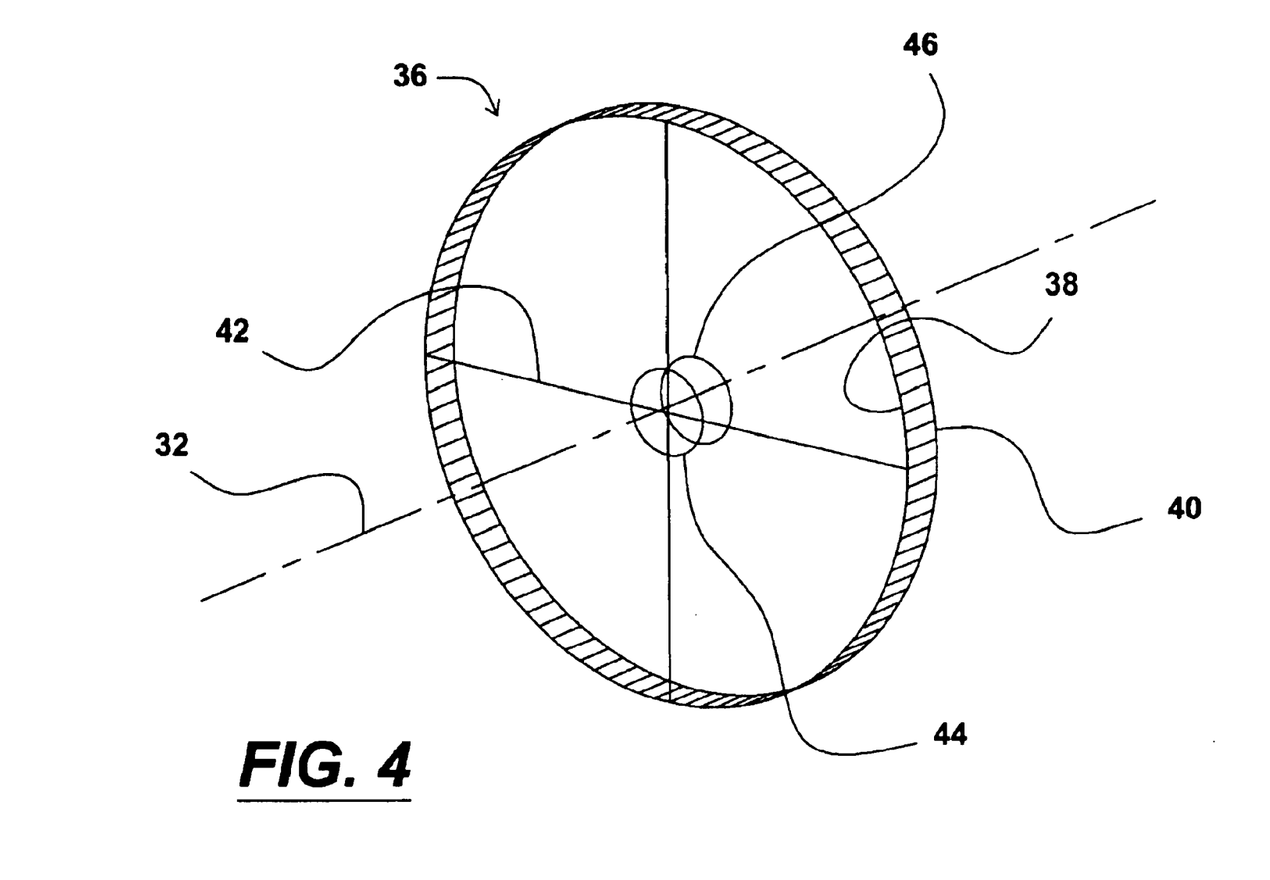
FIG. 4 is a perspective view of the reticle shown in FIGS. 2 and 3.

Referring now to FIG. 4, reticle 36 is mounted within housing 12 (FIG. 2) so that planar face 38 coincides with target image focal plane 34 (FIG. 2). Carried on planar face 38 is a set of crosshairs 42 which comprise a single vertical and horizontal line with their crossing point being precisely aligned with commonly shared optical axis 32. Also carried on planar face 38 of reticle 36 is primary indicator 44. Carried on opposing face 40 of reticle 36 is secondary indicator 46 which is optically identical in diameter to indicator 44. Indicators 44 and 46 are concentric to one another and are axially centered on common optical axis 32. It is the novelty of the relative axial displacement of indicators 44 and 46 that constitutes the subject matter of the present invention as will be explained in detail below.

Figure 5:
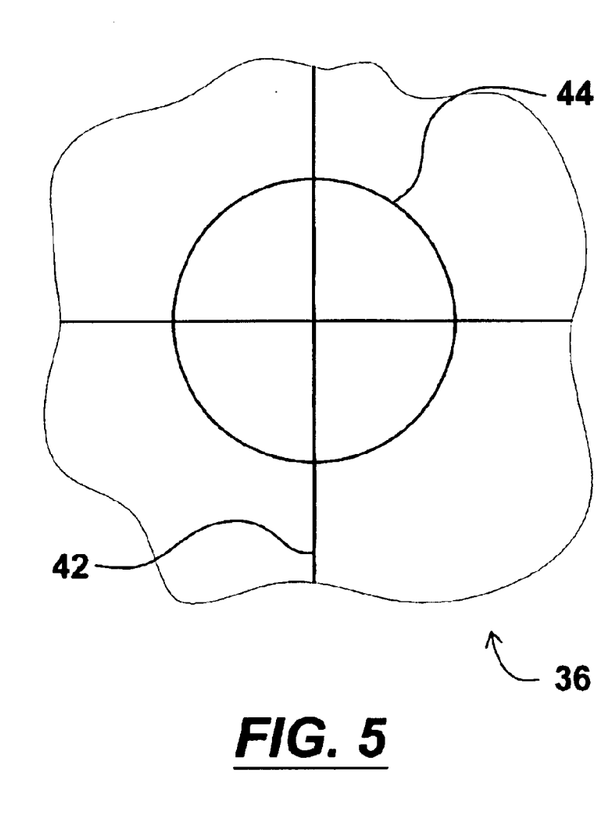
FIG. 5 depicts the appearance of the reticle as viewed through the ocular lens when the eye of an operator is centered on the optical axis of the riflescope.

With reference now to FIG. 5, reticle 36 is depicted in partial view to better show the relationships of key elements of the invention. These key elements of reticle 36 are depicted as seen by an operator looking into ocular lens 24 (FIG. 2) with the viewing eye precisely aligned with common optical axis 32 (FIGS. 2, 3 and 4). For purposes of clarity, the target image is not depicted in the following figures of drawing. When perfectly aligned as depicted in FIG. 5, primary and secondary indicators 44 and 46 are seen to be perfectly concentric relative to one another. Therefore, the operator effectively sees only indicator 44 since its image fully covers the image of indicator 46 which is disposed on opposing face 40 of reticle 36 (FIGS. 2, 3 and 4). Thus, primary and secondary indicators 44 and 46 form a composite image that readily signals alignment conditions to an operator. Perfect alignment of the eye of the operator is indicated when the eye perceives an image of a single indicator (indicator 44) since, as mentioned, indicator 44 fully covers the view of indicator 46 when such alignment is attained. Depending upon possible variables in magnification and axial displacement, the actual diameter of indicator 46 may be slightly larger than that of indicator 44 to assure images of optically equal diameter when the composite image is viewed by an operator. The significance of these relative alignments and sizing of the indicators will be better understood and appreciated with respect to the following description of their relationships when axial alignment is not maintained as will be demonstrated in FIG. 6.

Figure 6:
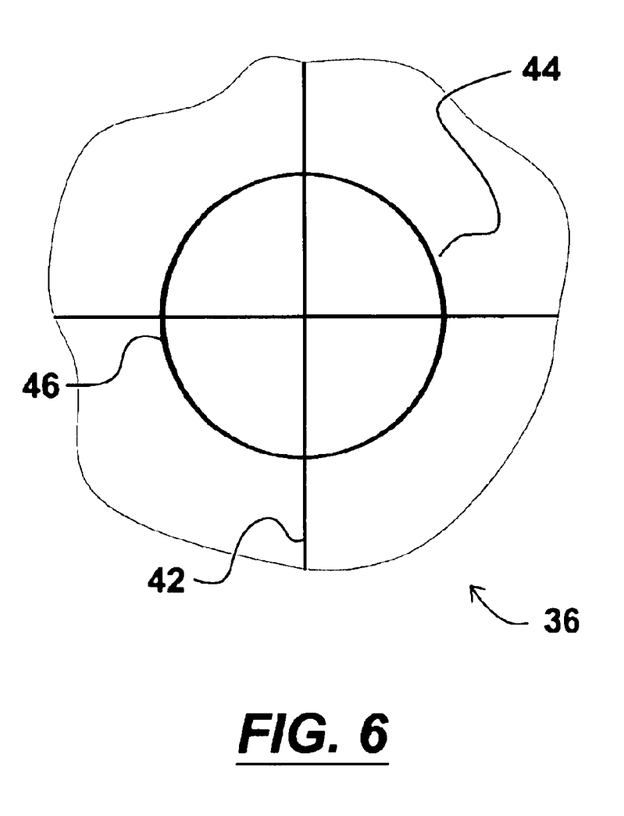
FIG. 6 is a view similar to that depicted in FIG. 4 but wherein the eye of an operator is shifted laterally off-axis by a distance of one degree (0.087").

With reference to FIG. 6, the eye of the operator has been shifted laterally to the left by a distance of one degree (less than one-tenth-of-an-inch) from common optical axis 32 (FIGS. 2, 3 and 4). A one degree shift of an operator's eye translates to an aiming error, at one hundred yards, of over five feet. This deviation from the optical axis is signaled to the operator by the obvious visible shift of the image of primary indicator 46 relative to that of secondary indicator 44. As illustrated in FIG. 5, the slightest shift from the axial center by the eye of the operator is visually conveyed to the operator without his/her having to actually look directly at the images of indicators 44 and 46. This is a significant feature of the present invention since the main objective of a riflescope or surveying telescope is to precisely align the image of crosshairs 42 with that of a target of interest. Thus, the operator may concentrate upon the crosshairs and target image while his/her peripheral vision checks, and, if necessary, corrects, the alignment of indicators 44 and 46. This action very quickly becomes intuitive and automatic, thus assuring accurate aim without the deleterious effects of parallax error.

As described and illustrated thus far, indicators, 44 and 46 are assumed to be of the same opaque material as crosshairs 42. An interesting variation of the present invention is to fabricate the indicators in transparent primary complementary colors, such as red and green. When transparent complementary colors are superimposed, they produce black. Thus, when the eye of an operator is properly centered on the optical axis of the riflescope, an apparent image of a single black indicator is perceived. Even the slightest deviation of the eye from the optical axis will produce a tinge of both bright red and bright green along the edges of the image. Such color changes are readily perceived by the peripheral vision of the operator without the operator having to take his or her eye off the target of interest.

Another variation would be to fabricate primary indicator 44 of the same opaque material as crosshairs 42 and fabricate secondary indicator 46 of a bright transparent color, such as red or green. When properly aligned the bright red image of secondary indicator 46 will be totally covered by that of primary indicator 44 and an operator will see no color, at all, only the black appearing image of the primary indicator.

Figure 7:
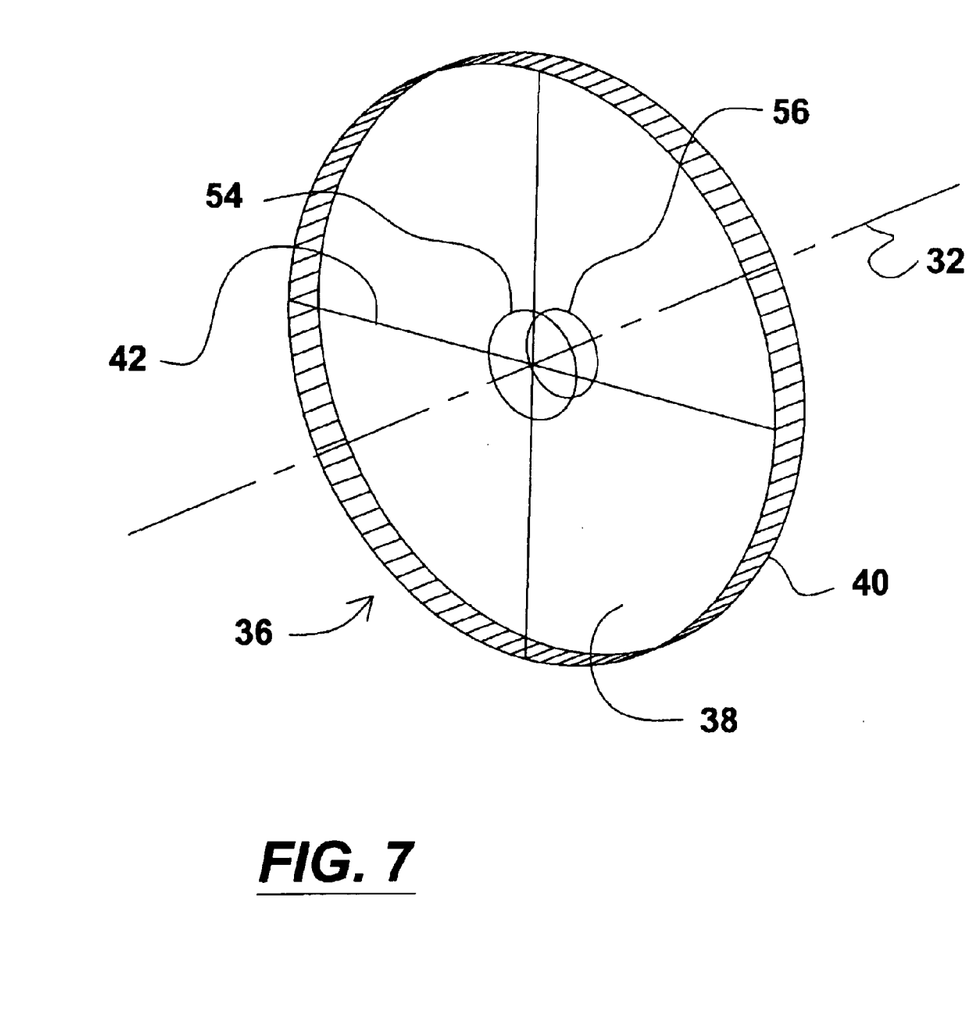
FIG. 7 is a perspective view of the reticle of a second embodiment of the present invention.
Figure 8:
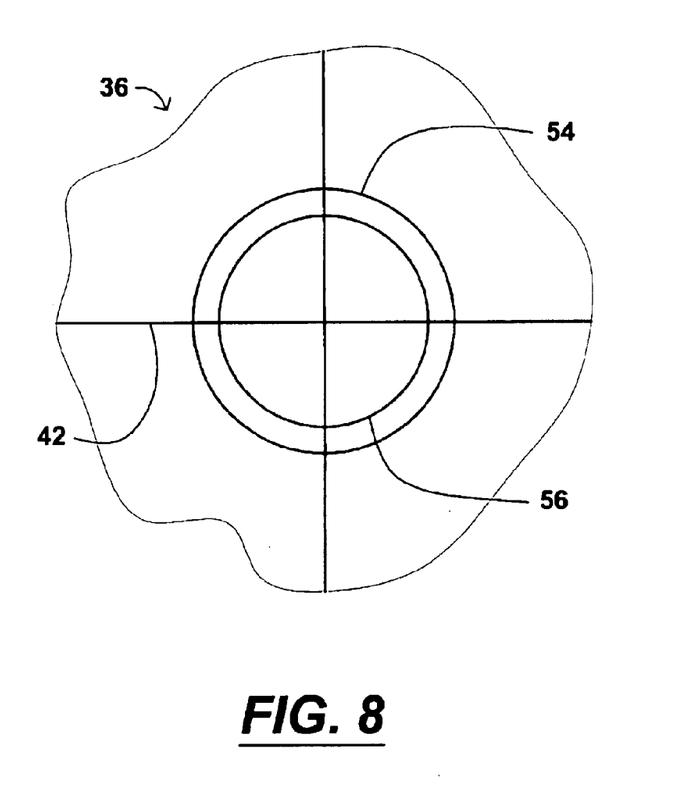
FIG. 8 depicts the appearance of the reticle of FIG. 7 as viewed through the ocular lens when the eye of an operator is centered on the optical axis of the riflescope.
Figure 9:
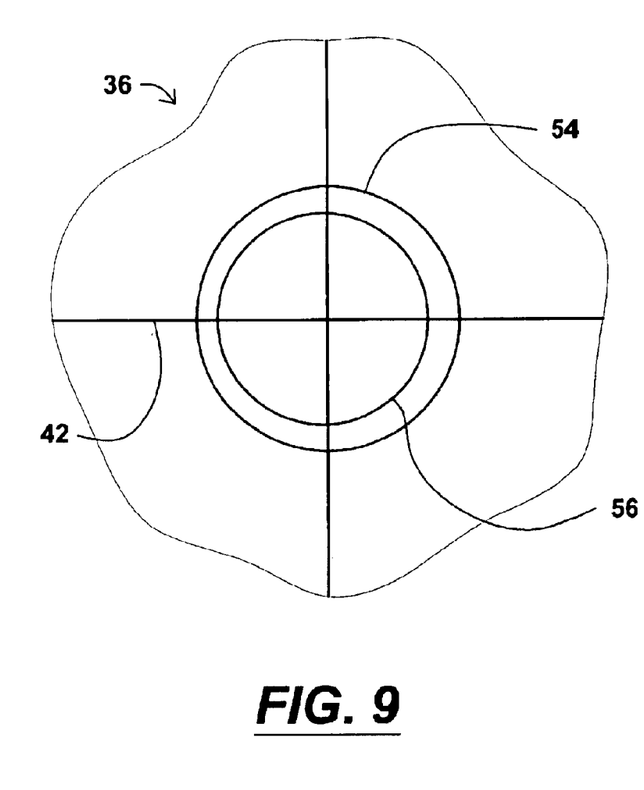
FIG. 9 is a view similar to that depicted in FIG. 7 but wherein the eye of an operator is shifted laterally off-axis by a distance of one degree (0.087").

Another variation of the present invention as described thus far is shown in FIGS. 7–9.

With reference now to FIG. 7, reticle 36 comprises opposing planar faces 38 and 40. As previously described, reticle 36 may be fabricated from optically flat glass, or the like. As stated earlier, a prototype of the present invention has a thickness of 2.5 mm (0.100"). Thus, in the prototype, faces 38 and 40 are spaced apart by the thickness of the reticle material (2.5 mm). Carried on planar face 38 are horizontal and vertical crosshairs 42 and primary indicator 54. Opposing planar face 40 carries secondary indicator 56.

Indicators 54 and 56 are concentric circles of unequal diameter. Primary indicator 54 is of a larger diameter than secondary indicator 56. The centers of indicators 54 and 56 and the crossing point of crosshairs 42 are designed so as to be centered on the optical axis of the riflescope as previously described.

With reference to FIG. 8, a view of reticle 36 is shown as seen by the eye of an operator looking into the ocular lens with the eye properly centered directly on the optical axis of the riflescope. When properly aligned in this manner, the image of secondary indicator 56 appears perfectly centered inside the image of primary indicator 54 as shown in FIG. 8.

FIG. 9 illustrates the effect produced by the eye of an operator being laterally displaced from the optical axis of the riflescope by an angle of one degree to the left (a lateral displacement of a mere 2.2 mm (0.087"). The image of secondary indicator 56 now appears eccentrically displaced to the left with regard to the image of primary indicator 54. This shift in the relationship of the two indicators is intuitively sensed by an operator for instantaneous correction of eye positioning to restore the concentricity of the images of the indicators as shown in FIG. 8. As stated previously, a one degree deviance in the centering of the eye of the operator, as shown in FIG. 9, translates to a significant error of aim of over five feet at a distance of only one hundred yard. At a range of two hundred yards, the error would be over ten feet.

In the embodiment shown in FIGS. 7–9, secondary indicator 56 is of a smaller diameter than primary indicator 54, rather than the other way around, for a very important reason. In looking through tubular devices, the ends of the tube appear as circles, the circle at the end opposite the viewer's eye appears smaller than does the circle at the end nearer the eye. Thus, when such a tubular device is moved laterally off axis relative to the eye, the smaller, more distant circle appears to move in the same direction as the lateral displacement. In the present invention, this is also true. Therefore, it is intuitive for an operator to know in what direction the eye must be moved to regain axial alignment.

Figure 10:
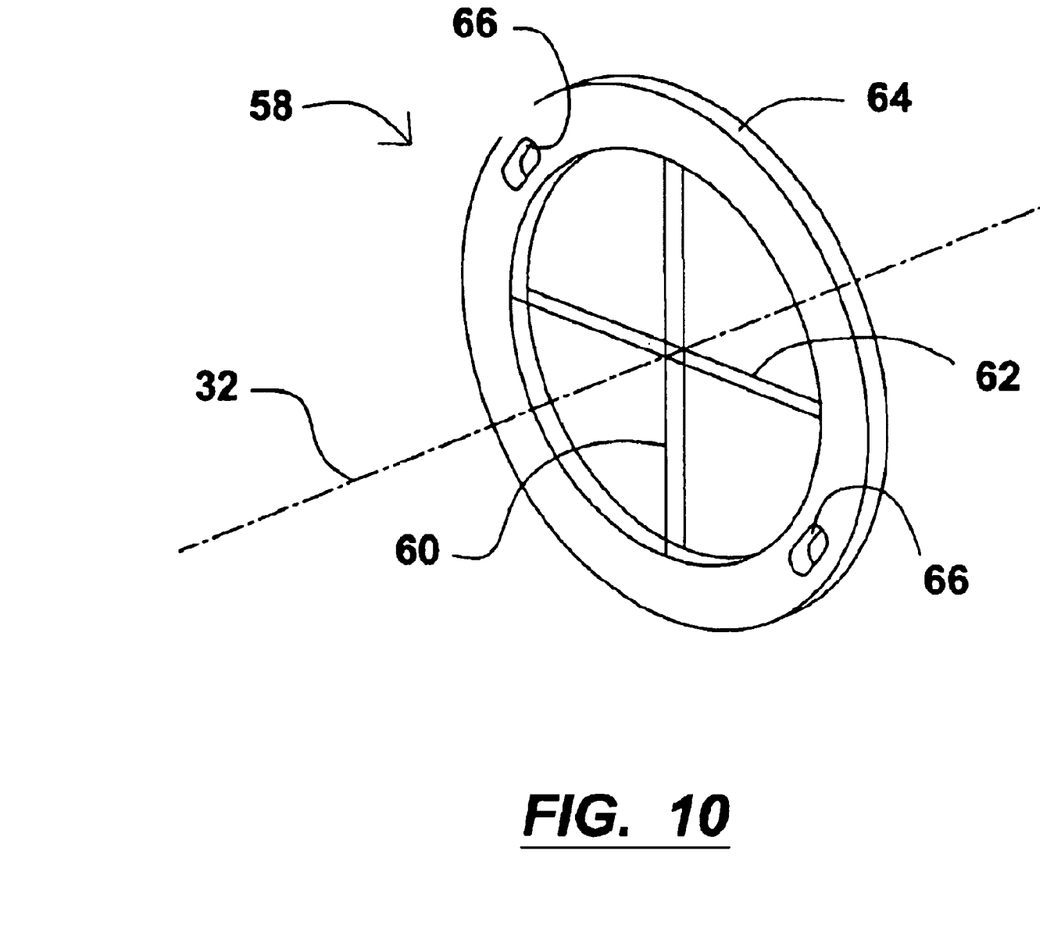
FIG. 10 is an isometric view of a crosshair embodiment of the present invetion.
Figure 11:
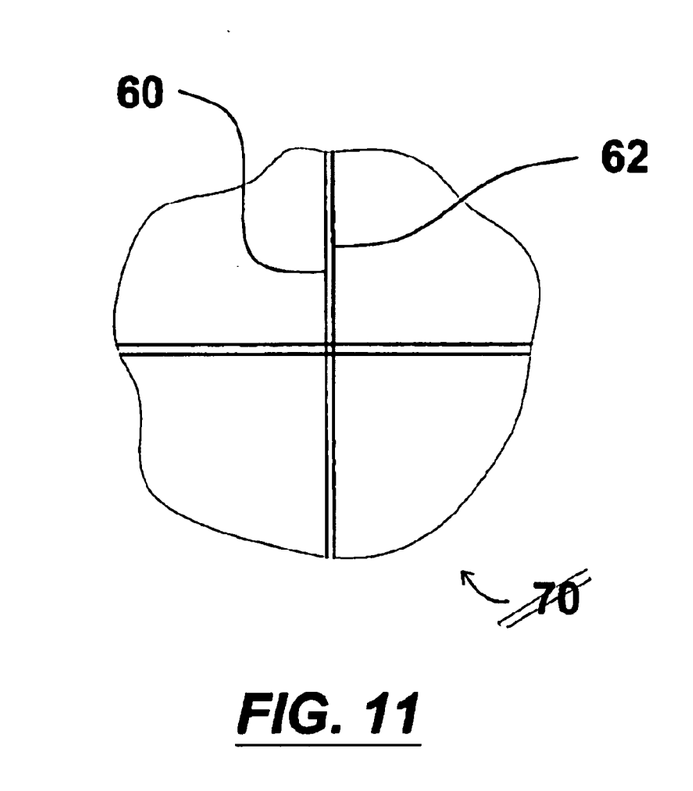
FIG. 11 is a partial view of the sight picture of the crosshair embodiment of FIG. 10 as viewed off-axis showing parallax error.
Figure 12:
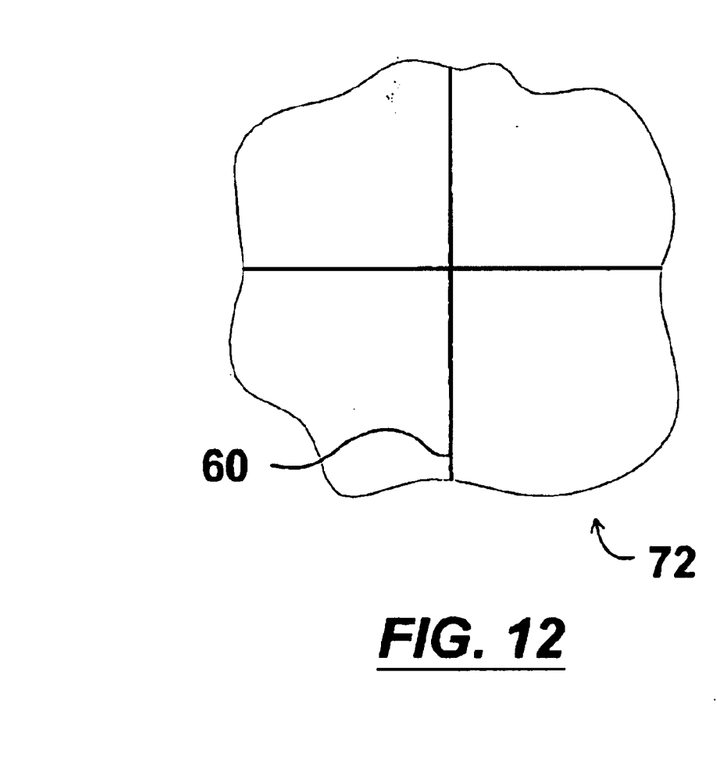
FIG. 12 is partial view of the sight picture of the crosshair embodiment of FIGS. 10–11 with paralllax corrected for accurate alignment of the instrument with an object of interest.

An alternate preferred embodiment of the invention is shown in FIGS. 10–12. FIG. 10 is an isometric view of an embodiment of a reticle 58 of the present invention comprising two sets of spaced-apart indicators 60 and 62 in the form of crosshairs mounted in reticle frame 64 and aligned on an optical axis 32. Reticle frame 64 has mounting slots 66 for receiving retaining screws for securing reticle frame 64 in position on optical axis 32 at the common plane of focus of image-erecting lenses 28–30 and occular lens 24 (FIG. 2). Primary and secondary indicators 60 and 62, respectively, may be formed of chemically-machined metal foil attached to opposite sides of reticle frame 64. It is common in modern riflescopes to provide reticles with such frames with the metal foil set of crosshairs attached to one side thereof FIG. 11 shows a partial view of a sight picture 70 provided by the crosshair embodiment 58 shown in FIG. 10 when the eye of the operator is not properly centered on the optical axis of the instrument. Incorrect orientation of the eye with the optical axis causes the operator to see an image of the crosshairs of secondary indicator 62 as well as those of primary indicator 60. In the case of a riflescope, the shooter's cheek is firmly planted against the stock of the rifle to which the optical instrument is attached. The act of 'cheeking', as it is known among shooters, helps greatly to stabilize the weapon relative to the observing eye of the shooter. Thus stabilized, the aiming error illustrated in FIG. 11 can be quickly corrected with a slight shifting of the cheek relative to the stock of the rifle as shown in FIG. 12.

FIG. 12 shows a partial view of a sight picture 72 seen by the operator, in this case, a shooter, when the eye and the optical axis of the optical instrument, in this case, a riflescope, are properly aligned to assure accurate aim at an object of interest, in this case, a target. Thus, properly aligned, the eye perceives only an image of primary indicator 60. It is worth noting that the sight picture of this embodiment, with alignment perfected, presents a very clean and uncluttered view of the field of view of the optical instrument.

The crosshair embodiment of FIGS. 10–12 adaptable economically because such reticles can be fabricated with chemically-machined metal foil at far less cost and assembly difficulty than glass reticles. Both metal foil and etched glass reticles have been common in the art of optical instruments for many years. Methods of fabricating both types are well known to those skilled in the art. The above described circle embodiment of the present invention, shown in FIG. 4, though preferred in many applications, dictates a glass reticle with etched primary and secondary indicators since it is not possible to fabricate a wire or foil pattern with delicate circular components required by this embodiment.

FIG. 11 shows the sight picture a user sees when his/her eye is not properly aligned with the optical axis of the instrument. Parallax error causes the image of the crosshairs of the primary indicator 60 to shift relative to the image of the crosshairs of the secondary indicator 62 making both sets of crosshairs visible to a user. When presented with this situation, the user simply shifts the aiming eye slightly to bring the two images into coincidence as shown in FIG. 12. When properly aligned as shown in FIG. 12, one set only the image the crosshairs of primary indicator 60. Thus, in the case of the present invention being mounted in a riflescope, when the eye is correctly aligned with the optical axis, the sight picture is identical to that of a conventional riflescope with a standard set of crosshairs.

Most modern riflescopes are equipped with metal foil reticles of the crosshair variety. The advantages of this method go beyond economy. Foil reticle patterns are photo-chemically machined to great precision. One example of a method for making such reticles is disclosed in U.S. Pat. No. 4,380,876, issued to Strassburg. Foil reticles are freestanding and have no glass substrate to absorb light, resulting in a sight picture. Since there is no glass substrate, dust and other debris have no surface to settle on near the plane of focus of the reticle which is a major assembly consideration with glass reticles. In addition, the crosshair embodiment is ideally suited for benchrest, varmint, and target shooting where the shooter has time to stabilize the rifle on supports in anticipation of firing at a target of interest. For these same reasons, the crosshair embodiment is ideally suited for other applications, such as, surveying telescopes and alignment microscopes while the circle embodiment of FIG. 4 is ideal for hunting situations which require rapid alignment of the image of the target with the optical axis of the riflescope.

While the above descriptions of the present invention contain numerous specificities, they should not be construed as limiting the scope of the invention but as mere illustrations of some of the preferred embodiments thereof. For example, the aiming indicators may be of shapes other than circles and crosshairs as illustrated in the embodiments presented. For example, the primary indicator may be the crosshairs, themselves, while the secondary indicators may be a second set of crosshairs spaced apart on the optical axis from the first indicator. Furthermore, one, or both, of the indicators may be illuminated, or made of a self-luminous material such as tritium, so as to further emphasize the relationship between the two indicators for perfecting alignment of the optical instrument.

Thus, the scope of the invention should be determined by the appended claims and their legal equivalents, rather than by the examples given.

We claim:

1. An improved optical instrument for alignment with an object of interest, comprising:
   a) a housing,
   b) an objective lens mounted in said housing at one end thereof for forming an image of said object of interest;
   c) an ocular lens mounted in said housing at the opposite end thereof, wherein said objective and said ocular lenses define an optical axis through said housing
   d) image-erecting optics mounted between said objective lens and said ocular lens on said optical axis for erecting said image formed by said objective ions, said image-erecting optics and said ocular lens sharing a plane of focus on said optical axis where said erected image is formed for viewing by an operator;
   e) a reticle mounted within said housing on said plane of focus, said reticle having at least one primary indicator on said optical axis, an image thereof being viewable together with said image of said object of interest formed by said objective lens and said image-erecting optics within said housing to facilitate alignment of said optical instrument with said object; and,
   f) at least one secondary indicator carried by said reticle, axially-centered with regard to said primary indicator and spaced-apart therefrom on said optical axis for forming a composite image with said image of said primary indicator, said composite image and said object image being viewable together by an operator by means of said ocular lens;

whereby said images of said primary and said secondary indicators are aligned by an operator to eliminate parallax error relative to said image of said object to assure accurate alignment of said optical axis of said optical instrument with said object.

2. The apparatus of claim 1 wherein said reticle includes crosshairs on said plane of focus, said crosshairs forming a crossing point centered upon said optical axis.

3. The apparatus of claim 2 wherein said crosshairs are on the plane occupied by said primary indicator.

4. The apparatus of claim 1 wherein said primary and said secondary indicators are formed of transparent material in complementary colors.

5. The apparatus of claim 1 wherein said primary indicator is formed of an opaque material and said secondary indicator is formed of a transparent colored material.

6. The apparatus of claim 1 wherein said primary and said secondary indicators are formed of an opaque material.

7. The apparatus of claim 1 wherein said primary and said secondary indicators are shaped and sized substantially alike so that, when an operator's eye is centered on said optical axis, said image of said primary indicator completely covers said image of said secondary indicator.

8. The apparatus of claim 1 wherein said primary and said secondary indicators are concentric circles of substantially equal diameter so that, when the operator's eye is centered on said optical axis, said image of said primary indicator completely covers said image of said secondary indicator.

9. The apparatus of claim 1 wherein said primary and secondary indicators are concentric circles of unequal diameter so that, when an operator's eye is centered on said optical axis, said image of said secondary indicator is centered within said image of said primary indicator.

10. The apparatus of claim 1 wherein said primary and said secondary indicators are in the form of crosshairs.

11. A method for eliminating parallax error when aiming an optical instrument at an object of interest, said optical instrument having a housing, an objective lens mounted in one end of said housing, an ocular lens mounted in the opposite end of said housing; said objective lens and said ocular lens defining an optical axis through said housing, image-erecting optics disposed on said optical axis for forming an erect image of said object of interest, said image-erecting optics and said ocular lens sharing a common focal plane within said housing, and, a reticle mounted within said housing on said plane of focus, said reticle carrying a primary indicator on said plane of focus and a secondary indicator spaced-apart from said primary indicator on said optical axis for forming a composite image of said primary and said secondary indicators, said composite image and said image of said object of interest being viewable together by an operator by means of said ocular lens; said method comprising the steps of:
   a) pointing said optical instrument at said object of interest;
   b) centering said image of said object of interest on said optical axis; and
   c) centering said composite image of said primary and said secondary indicators relative to one another and said image of said object of interest so as to perfect aim of said instrument with respect to said object of interest.

12. The method of claim 11 wherein said reticle includes a set of crosshairs, said crosshairs forming a crossing point centered upon said optical axis.

13. The method of claim 12 wherein said crosshairs are on the plane occupied by said primary indicator.

14. The method of claim 11 wherein said primary and said secondary indicators are formed of transparent material in complementary colors.

15. The method of claim 11 wherein said primary indicator is formed of an opaque material and said secondary indicator is formed of a transparent colored material.

16. The method of claim 11 wherein said primary and said secondary indicators are formed of an opaque material.

17. The method of claim 11 wherein said primary and said secondary indicators are concentric circles of substantially equal diameter so that, when an operator's eye is centered on said optical axis, said image of said primary indicator completely covers said image of said secondary indicator.

18. The method of claim 11 wherein said primary and said secondary indicators are concentric circles of unequal diameter so that, when an operator's eye is centered on said optical axis, said image of said secondary indicator is centered within said image of said primary indicator.

19. The method of claim 11 wherein said primary and said secondary indicators are in the form of crosshairs.

20. The apparatus of claim 19 wherein, when an operator's eye is centered on said optical axis, said image of said primary indicator fully covers said image of said secondary indicator so that the operator sees only said image of said primary indicator.

21. An improved riflescope for use with a firearm for accurately aiming said firearm at a target of interest, comprising:
   a) a housing;
   b) an objective lens mounted in said housing at one end thereof;
   c) an ocular lens mounted in said housing at the opposite end thereof, wherein said objective and said ocular lenses define an optical axis through said housing;
   d) image-erecting optics mounted between said objective lens and said ocular lens on said optical axis for erecting an image of said target of interest formed by said objective lens, said image-erecting optics and said ocular lens defining and sharing a plane of focus on said optical axis where said erected image is formed for viewing by an operator;
   e) a reticle mounted within said housing on said optical axis at said plane of focus for viewing together with an image of said target of interest formed by said objective lens and said image-erecting optics within said housing to facilitate alignment of said riflescope with said target of interest
   f) a primary indicator on said reticle at said plane of focus for viewing together with said image of said target of interest formed by said objective lens within said housing; and,
   g) a secondary indicator carried by said reticle and axially-centered with regard to said primary indicator and spaced-apart therefrom on said optical axis for forming a composite image of said primary and said secondary indicators, said composite image and said image of said target of interest being viewable together by an operator by means of said ocular lens;

whereby the images of said primary and said secondary indicators are aligned by an operator so that said images of said primary and said secondary indicators are centered when an operator's eye is directly aligned with said optical axis thereby eliminating parallax error to assure accurate alignment of said optical axis of said riflescope with said target of interest.

22. The apparatus of claim 21 wherein said reticle includes crosshairs on said plane of focus, said crosshairs forming a crossing point centered upon said optical axis.

23. The apparatus of claim 21 wherein said primary indicator and said secondary indicator are formed of transparent material in complementary colors.

24. The apparatus of claim 21 wherein said primary indicator is formed of an opaque material and said secondary indicator is formed of a transparent colored material.

25. The apparatus of claim 21 wherein said primary and secondary indicators are formed of an opaque material.

26. The apparatus of claim 21 wherein said primary and said secondary indicators are concentric circles of substantially equal diameter so that, when the operator's eye is centered on said optical axis, said image of said primary indicator completely covers said image of said secondary indicator.

27. The apparatus of claim 21 wherein said primary and said secondary indicators are concentric circles of unequal diameter so that, when an operator's eye is centered on said optical axis, said image of said secondary indicator is concentric with said image of said primary indicator.

28. The apparatus of claim 21 wherein said primary and said secondary indicators are in the form of crosshairs.

29. The apparatus of claim 28 wherein, when an operator's eye is centered on said optical axis, the image of said primary indicator fully covers the image of said secondary indicator so that the operator sees only the image of said primary indicator.

* * * * *